United States Patent

[11] 3,571,789

[72] Inventor Bernard J. Midlock
 Norwalk, Conn.
[21] Appl. No. 777,854
[22] Filed Nov. 21, 1968
[45] Patented Mar. 23, 1971
[73] Assignee LFE Corporation
 Waltham, MA,

[54] VEHICLE PRESENCE LOOP DETECTOR
 11 Claims, 5 Drawing Figs.
[52] U.S. Cl. .................................................. 340/38
[51] Int. Cl. .................................................. G08g 1/01
[50] Field of Search .................................... 340/38

[56] References Cited
 UNITED STATES PATENTS
 3,266,028 8/1966 Taylor et al. ................. 340/38(L)X
 3,500,310 3/1970 Marcinkiewicz ............. 340/38

Primary Examiner—William C. Cooper
Attorney—Edward H. Eames

ABSTRACT: A vehicle presence detection system comprising an electrical signal generating system including a tuned circuit having a large magnetic field producing induction loop for receiving a vehicle in proximity thereto to change the field configuration and corresponding signal phase resulting therefrom, a phase comparator-detector for receiving said generated signals including the phase variations resulting from such field changes to produce a variable DC signal voltage which changes from a resting level to a second level in one direction of change in response to entrance of a vehicle into proximity to the loop and which changes in the opposite direction from the second level substantially to the resting level upon departure of the vehicle from such proximity to the loop, an in-amplifier for receiving said variable DC signal voltage to produce an output electrical signal responsive to said DC signal change of relatively rapid rate in the one direction of change, an out-amplifier for also receiving the variable DC signal voltage to produce a second output electrical signal responsive to said DC signal change in such opposite direction at a relatively rapid rate of change, a gating or latchup circuit for receiving the in-amplifier and out-amplifier output signals to produce a further output signal substantially throughout the period between the first and second output electrical signals, and indicator means for receiving the gated further output signal for producing an indication of the presence of the vehicle in proximity to the inductive loop. The in-amplifier includes a time delay circuit to maintain its output electrical signal for a brief time period while a vehicle is maneuvering in proximity to the loop without departing.

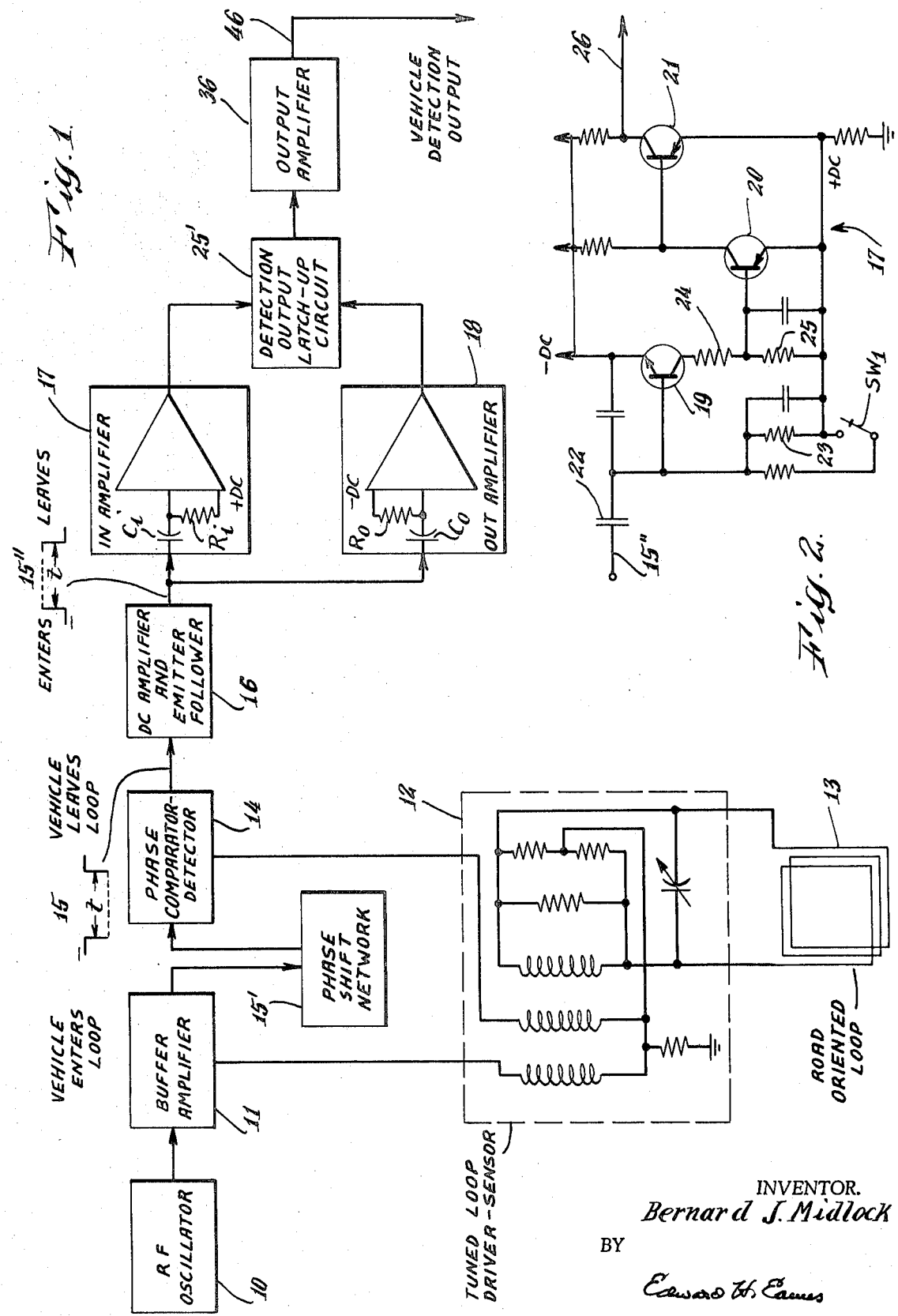

INVENTOR.
Bernard J. Midlock
BY Edward H. Eames
ATTORNEY.

VEHICLE PRESENCE LOOP DETECTOR

BACKGROUND

This invention relates to vehicle presence detectors and more particularly, this invention relates to systems wherein an inductive loop is positioned to generate a magnetic field in a path for vehicles and wherein the inductive characteristics of the loop are varied when the metallic mass of a vehicle moves into the magnetic field.

Inductive loop vehicle presence detectors are commercially available wherein an inductive loop is connected as a part of a tuned circuit for controlling the frequency of an oscillator. In such a system a vehicle may enter the field of the loop and the inductance value of the loop will vary to change the frequency of the oscillator. A change in the oscillator frequency is sensed to provide an output signal in a system of this sort. Other inductive loop presence detectors use fixed frequency, crystal controlled oscillators for generating a signal which is passed through a phase shifting circuit including an inductive loop. When a vehicle moves into the field of the loop, a change occurs in the phase angle, and a phase discrimination circuit provides an output signal.

The loop detector systems above referred to fail to take into consideration the presence of a vehicle over a long interval of time in the loop area, nor do such systems take into consideration environmental changes in the loop area such as temperature, pressure, moisture, rain, etc., all of which create an inductive or capacitive change effect which will alter the frequency or phase characteristics of the loop circuit. Further, such systems are usually sensitive to vehicular movements within the confines of the sensing area or loop to thus render a false impression of the presence or absence of a vehicle.

It is therefore a principal object of the invention to provide an improved type of vehicle presence loop detector system.

Another object of the invention is to provide a loop detector system which senses the presence of a vehicle substantially without time limitation so long as the vehicle remains substantially within the confines of such loop.

Another object of the invention is to provide a loop detection system for sensing the presence of vehicles which is insensitive to environmental changes within the vicinity of said loop while still remaining sensitive to the presence of a vehicle.

A still further object of the invention is to provide a loop detector system which is capable of distinguishing between changes in the loop field created by environmental changes and the presence or absence of a motor vehicle.

A still further object of the invention is to provide a loop detection system which is capable of distinguishing between the presence of a vehicle in proximity to a given sensing loop and the intermittent movements of such vehicle within the confines of such loop.

Numerous other objects and advantages will become apparent from a reading of the specification and a study of the accompanying drawings of the invention in which:

FIG. 1 is a simplified block diagram of the loop detector system according to the invention;

FIG. 2 and 3 show schematic diagrams of an in-amplifier and an out-amplifier, each driven by a DC amplifier and emitter follower according to the block diagram of FIG. 1.

Wherever possible, throughout this specification, like parts having the same function will be designated by the same reference numerals.

Figure 5:
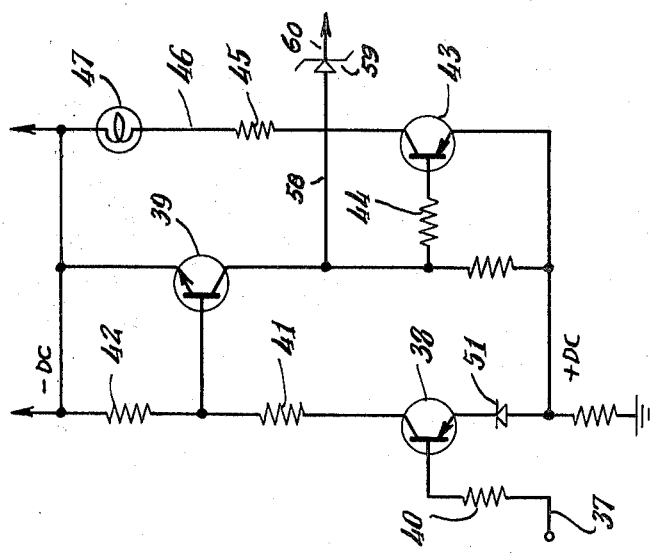
FIG. 5 shows a schematic diagram of an output amplifier according to the block diagram of FIG. 1.

Now describing the invention in particular detail with respect to the various FIGS. there is shown in FIG. 1 a fixed frequency RF oscillator 10 such as a crystal controlled oscillator passing a signal to a buffer amplifier 11. The same frequency signal from buffer amplifier 11 also is passed through a tuned-loop driver sensor 12 containing a coupling transformer and containing capacitors, or a variable capacitor, for tuning purposes. A road-oriented loop 13 is coupled to loop-driver 12 to complete the tuned network. The output of the tuned-network 12 and buffer 11 are both passed to a phase comparator-detector 14. A phase-shift network 15' adjusts the phase of the output signal from buffer amplifier 11 so as to set the desired normal phase relation to that of the tuned loop 12. This normal phase relation may be between 45° and 90°, for example. This adjustment permits the phase relation of the outputs of the buffer and tuned loop to be such as to establish the desired DC resting voltage level at the output 15 of the phase comparator-detector. Any substantial change in the magnetic field configuration of the road-oriented loop 13, such as resulting from the presence of a vehicle, produces a phase change which is converted to a change in level of the DC signal in a given direction of change, by the phase comparator detector 14.

The output DC signal 15 is transmitted to a DC amplifier and emitter-follower 16 and the output thereof fed simultaneously to in-amplifier 17 and out-amplifier 18, to be presently described.

Referring now to FIG. 2, there is shown therein an "in-amplifier" 17 serving as a switching amplifier, comprising DC coupled cascaded amplifier stages 19, 20 and 21, the stage 21 serving as an output stage. The output signal 15" from the amplifier emitter-follower 16 is fed to the base of amplifier 19 via a relatively large coupling capacitor 22 and a base biasing resistor 23. The collector output from stage 19 is passed to the base of amplifier stage 20 via a voltage divider comprising resistors 24 and 25. The collector output of stage 20 is fed to the base of amplifier stage 21 and the collector output therefrom fed to the output latchup circuit 25' shown in FIG. 4, via conductor 26.

Figure 3:
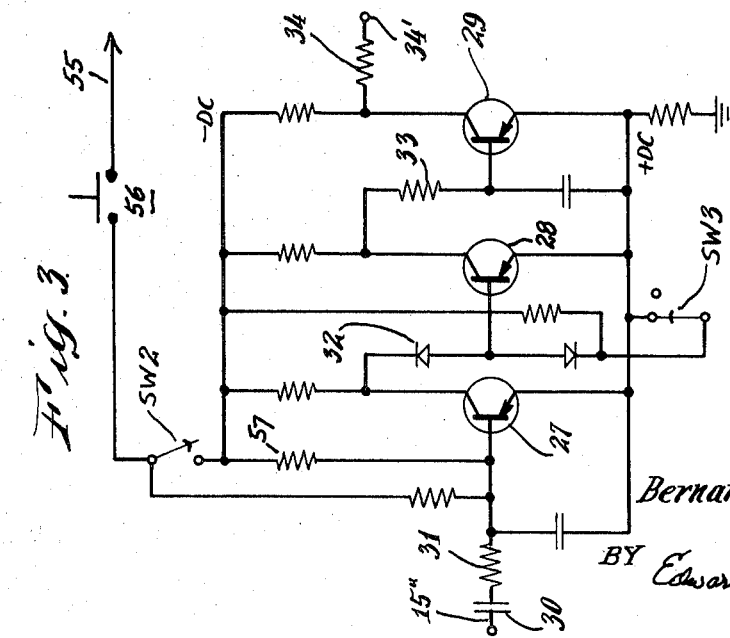

FIG. 3 represents the "out-amplifier" 18 and is comprised of amplifier stages 27, 28 and 29. The output signal 15" from the DC Amplifier-emitter follower 16 is fed to the base of amplifier 27 through a coupling capacitor 30 and current limiting resistor 31. The collector output of stage 27 is passed to the base electrode of stage 28 through a biased diode 32. The collector output of stage 28 is passed to the base electrode of amplifier stage 29 through a coupling resistor 33. The collector output of stage 29 is thereafter passed through a coupling resistor 34 and terminal 34' to the output latchup circuit 25' of FIG. 4. via diode 35. Hence, there is shown outputs from both the "in-amplifier" and "out-amplifier", each of which feeds an output latchup circuit 25'.

Figure 4:
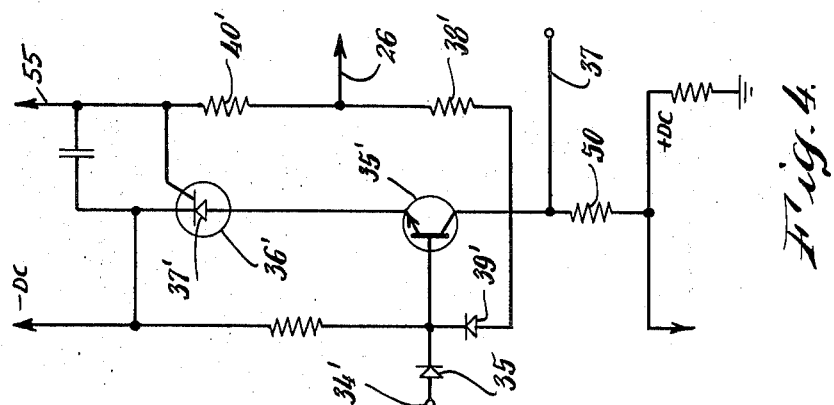
FIG. 4 shows a schematic diagram of a detection output and latchup or gating circuit according to block diagram of FIG. 1.

The output latchup circuit of FIG. 4 comprises an amplifier stage 35' connected directly to the anode 37' of silicon controlled rectifier (SCR) of switching stage 36'. The output conductive path 26 from the in-amplifier 17 (of FIG. 3) is coupled to the output latchup stage (25' of FIG. 4) via a divided path, one through coupling resistor 38' and series diode 39' to the base of amplifier stage 35' and the other path through coupling resistor 40' to the gate input of SCR switching stage 36'. The output from the out-amplifier of FIG. 3 is coupled to the output latchup circuit of FIG. 4 through coupling resistor 34 and diode 35 to the base electrode of amplifier stage 35'.

The output from the latchup circuit 25' of FIG. 4 is then transferred to an output amplifier 36, as shown in FIG. 5, via conductor 37. The output amplifier 36 comprises amplifier stages 38, 39 and 43. Amplifier stage 38 is base fed via conductor 37 through coupling resistor 40. The collector output of stage 38 is fed to the base of amplifier stage 39 via voltage divider resistors 41, 42 connected to the collector electrode. The collector output of amplifier stage 39 is transmitted to the base of stage 43 via coupling resistor 44. Finally, the collector output of amplifier stage 43 is passed via coupling resistor 45 and conductor 46 to an output visual indicator 47 for purposes of giving a signal indication when excited.

In operation, the movement or presence of a vehicle in the inductive loop 13 changes the magnetic field configuration associated therewith to produce an output signal as previously described. The output signal 15 of phase comparator-detector 14 is a positive going DC signal (going less negative) which deviates from the quiescent voltage (−5 volts for example) normally available in the absence of any vehicle in the loop. This quiescent value is changed by the vehicle presence to produce the positive going voltage as stated and indicated in the signal voltage variation diagram 15 in FIG. 1.

Initially, with no vehicle present in the loop, there is a quiescent signal of approximately −13 volts, for example, at the output of DC Amplifier-emitter follower 16 as indicated at 15" in FIG. 1, so that "in-amplifier" stages 19 and 20, as configured in FIG. 2, are fully conducting and amplifier stage 21 is nonconducting. Also, the output collector voltage of stage 21 is set at approximately −23 Volts, for example this voltage being transmitted via conductor 26 to the output latchup circuit of FIG. 4. Simultaneously, in the out-amplifier as configured in FIG. 3, the amplifier stage 27 is conductive and amplifier stage 28 nonconducting. Also, amplifier stage 29 is conducting so that the base of stage 35' in the output latchup circuit of FIG. 4 is forward biased through current limiting resistor 34 and steering diode 35. Stage 35' does not conduct however, because SCR switch 36', in the emitter return path of stage 35', is nonconductive since the voltage at the gate of the SCR is −23 Volts. This gate voltage is received from the in-amplifier output path 26 as mentioned above. Since stage 35' is nonconductive, there is no collector output therefrom. The output amplifier 36 of FIG. 5 is so configured that the stages 38,39 and 43 are nonconductive in the absence of any output from the output latchup circuit of FIG. 4 along path 37. Under these circumstances, since there is no output from stage 43, the collector output therefrom fails to excite the lamp indicator 47 connected to the output path 46.

When a vehicle enters the loop to change the field configuration thereof, there are produced resulting signals 15 and 15" created by the change in phase conditions as previously stated. A condition exists accordingly whereby the signal produced at 15" is a negative going one which in turn creates bias changes at stages 19 and 20 of the in-amplifier of FIG. 2 in a direction so as to render the said stages nonconductive. Simultaneously, stage 21 will be conductive so as to reduce the collector voltage thereat to approximately −2 Volts, for example, which voltage is thereafter transmitted along path 26 to the output latchup stage of FIG. 4. The negative going signal voltage 15" couples to the in-amplifier 17 through coupling capacitor 22, which together with resistor 23 constitutes a discharging circuit of relatively long time constant of the order of several minutes or more for example. Simultaneously, the same signal voltage couples to the out-amplifier of FIG. 3 through a coupling capacitor 30 which together with resistor 31 constitutes a charging circuit of relatively short time constant of the order of one fifth of that of Capacitor 22, Resistor 23, for example.

The relatively small negative voltage, −2 Volts, is coupled to the gate circuit of SCR switching stage 36' through current limiting resistor 40' via path 26, previously stated, so as to make the gate voltage less negative and simultaneously producing a forward bias at the base of stage 35' through current limiting resistor 38' and steering diode 39'. Under these changed bias conditions, the switching stage 36' conducts, thereby creating a return path for the emitter of stage 35' and resistor 50 connected thereto. Also a return path is created with a parallel circuit path consisting of coupling resistor 40 and base and emitter of stage 38 through emitter bias diode 51 connected to the emitter of stage 38. Under these circumstances with stage 35' conducting, there is caused to conduct stage 38, 39 and 43, thereby producing an output voltage of approximately −3 Volts, for example, along path 46 to excite the indicator lamp 47. This output voltage remains substantially constant for as long a period as the vehicle remains in the inductive loop inasmuch as the negative going signal 15" will remain for a time t, the time in which the vehicle remains.

As stated previously, a negative going signal 15" is produced when the vehicle enters the loop so that an indication of vehicle presence is produced in the output indicator circuit. However, where the vehicle in the loop is constantly being reoriented, such as at a truck loading platform and the like, the field of the loop undergoes certain variations so that relatively small changes in voltage are produced at the phase-detector output. The output of the in-amplifier is sustained by the relatively slow discharge circuit in the in-amplifier 17 of FIG. 2 consisting of capacitor 22 and resistor 23. When the vehicle first enters the loop, a relatively large negative going signal 15" is produced thereby shifting the voltage at capacitor 22, tending to discharge it. Hence, because of the large time constant, it takes a considerable time for capacitor 22 to discharge. Thus the bias conditions at stage 19 are held so that it does not conduct over this relatively long period and the resulting output from stage 21 remains at approximately −2 Volts. Hence, small variations, due to maneuvering of the vehicle while within the loop, will fail to change the −2 Volts output voltage from the in-amplifier. The bias conditions at stage 35' and switch 36' will be maintained so as to permit the continuance of conduction and to maintain an output presence signal continuously.

After the vehicle has discontinued its maneuvering and perhaps for a time thereafter, the capacitor will discharge to a new quiescent voltage as set by the output from the DC Amplifier-emitter follower 16 as controlled by the phase comparator circuit. At this point in time, the output voltage from the in-amplifier 17 of FIG. 2 will return to its original −23 Volts. However, with the vehicle still present, with the new quiescent voltage level at 15", the out-amplifier continues with its input forward biased to maintain its normal low or "no signal" output, and stage 35" will remain biased forward via diode 35, and SCR switch 36' will remain in a condition to permit the continuance of conduction, although the −23 volts at the gate of switch 36' removes the forward bias through resistor 40' and also the alternate forward bias on the base of stage 35' through resistor 38' and diode 39'. The switch 36' is in the latchon or full conducting state because of the anode current supplied by the emitter collector current path of stage 35', and by the consequent negative voltage the collector load resistor 50 applied through resistor 40, the emitter base junction of stage 38 remains forward biased. Under these circumstances stages 38, 39 and 43 remain conducting, and lamp indicator 47 remains excited. This condition remains for as long as the vehicle stays in the loop.

The above conditions reverse when the vehicle leaves the loop. For example, the negative going voltage 15" is made less negative, changing in the opposite direction to return to its original resting voltage, so that the condition that prevailed prior to the vehicle presence in the loop is restored and there is no visual or other indication of a vehicle presence. The quiescent condition of the loop, in the absence of a vehicle may change due to environmental changes but such changes will be relatively quite slow so as not to have any effect because of the relatively large signals produced by the presence of a vehicle and the retention of condition of such changes as to make changes due to environmental changes insignificant.

The in-amplifier controls both the gate and anode current supply of switch 36' so as to cause it to conduct while the vehicle is moving into position over the loop holding the output indications on until the parking position is reached. While the vehicle parking maneuver is taking place, the level of the signal 15" may shift about in following the contour of the parts of the vehicle that pass over the loop before the final parked position is reached. During the parking maneuver, the out-amplifier stages 27, 28 and 29 may unbias stage 35' through resistor 34 and diode 35 but the forward bias supplied by the in-amplifier holds stage 35' fully conducting through resistor 38' and diode 39'.

Line 58 via Zener Diode 59 provides on line 60 an alternate output for coupling to a detector input circuit of a traffic signal controller where circuitry of opposite polarity may be involved. The Zener Diode 59 may preferably be of the type having a 20 volt internal voltage drop, to absorb much of the 23 volt negative supply of this loop detector circuit. Switches SW1, SW2 and SW3 are preferably ganged to be operated together for resetting the present circuits to an initial resting condition if desired, switch SW3 being normally closed and the others normally open as shown for normal operation. Switch 56 may be closed momentarily if desired to set the gating or latchup circuit into conduction for presence indication manually for testing for example.

From the foregoing it may be appreciated that the invention has been described and illustrated with respect to a certain particular preferred embodiment which gives satisfactory results, but it will be understood by those skilled in the art, after understanding the principle of the invention, that various changes and modifications may be made without departing from the spirit and scope of the invention and it is intended therefore in the appended claims to cover all such changes and modifications.

Having defined the invention, what is claimed is:

I claim:

1. A vehicle presence detection system comprising:
   a. an electrical signal generating system including tuned circuit means having a large magnetic field producing induction loop for receiving said vehicle in proximity thereto to change the field configuration and corresponding signal phase resulting therefrom;
   b. means for receiving said generated signals including said phase variations resulting from said field changes to produce a variable DC signal;
   c. first amplifier means for receiving said variable DC signals to produce a first output electrical signal responsive to the initiation of said DC signal variation;
   d. second amplifier means for receiving said variable DC signals to produce a second output electrical signal responsive to the termination of said DC signal variations;
   e. gate circuit means for receiving the said first and second output electrical signals to produce an output signal responsive to said first output electrical signal and to terminate such gated output signal in response to said second output electrical signal; and
   f. means for receiving said gated output signal for producing an indication of the presence of said vehicle in the inductive loop.

2. A vehicle presence detector system according to claim 1 and wherein said first amplifier means further comprises a resistor-capacitor input network having a long time constant for receiving and temporarily storing said DC signal and amplifier.

3. A vehicle presence detector system according to claim 2 and wherein said first amplifier means includes first and second transistor stages normally conductive in the absence of any said DC signal variation and a third normally nonconductive transistor stage driven by said first and second stage, the said three stages reversing their conductive status responsive to the presence of said DC signal variation so as to produce a first output driving voltage from said third stage.

4. A vehicle presence detector system according to claim 1 and wherein said second amplifier means further comprises a resistor-capacitor input network having a short time constant for receiving said DC signal variations, and amplifier means connected thereto and controllable thereby, the said last named amplifier means disposed to produce a quiescent voltage in the absence of and during a DC signal variation in one direction and a second driving voltage or second output signal responsive to variations of said DC signal in the opposite direction.

5. A vehicle presence detector system according to claim 4 and wherein said second amplifier means includes a first, second and third transistor stage, the first and third conductive and the second nonconductive in the absence of such DC signal variation in said first direction, and the conductive conditions reversed in response to such DC signal variation so as to produce a second output driving voltage from said third stage.

6. A vehicle presence signal detecting system according to claim 1 and wherein said gate circuit means includes first and second transistor stages each connected to provide a continuous current path when both are conducting, the first stage disposed to receive the said first and second driving voltages from said first and second amplifier means through coupling means, each coupling means being connected to the base of said first transistor stage and the said second stage being disposed to receive said first driving voltage from said first amplifier means through a coupling impedance connected thereto.

7. A vehicle presence signal detection system according to claim 6 and wherein said base coupling means includes dual diodes forward biased during the said first and second driving voltages to render the said first transistor stage conductive, and the said coupling impedance includes a current limiting resistor to drive the said second stage to conduction when the first driving voltage is applied thereto, the conduction of both stages producing a continuous current path therebetween to produce an output signal.

e. out-amplifier means for receiving said variable DC voltage to produce an output voltage of relatively short duration responsive to said DC voltage variations in said opposite direction;
   f. gate circuit means for receiving the said in-amplifier and out-amplifier outputs for producing a gated output signal responsive to said DC voltage variations; and
   g. means responsive to said gated signals to produce an output indicative of the presence of absence of vehicles in the inductive loop.

8. A vehicle presence system as in claim 1 and in which said gate circuit means includes a silicon controlled rectifier and a transistor, coupled with the collector-emitter circuit of the transistor in series with the anode-cathode circuit of said rectifier to supply anode voltage to said rectifier when said transistor is forward biased, the gate of said silicon controlled rectifier being coupled to the output of said first amplifier and the base of said transistor being coupled to the output of said second rectifier.

9. A vehicle presence system as in claim 8 and including a circuit including a diode coupling said base to said output of said first amplifier.

10. A vehicle presence loop detection system for determining the long term presence of vehicles while being insensitive to vehicle movements in the area of detection comprising:
    a. a field frequency signal generator;
    b. a tuned circuit including an inductive loop for receiving said vehicle in proximity thereto;
    c. phase-comparator detection means for receiving signals from said generator and tuned circuit for producing an initial DC voltage variation of substantial amplitude in one direction of change responsive to the phase difference resulting from the presence of a vehicle in said loop;
    d. in-amplifier means for receiving said variable DC voltages to produce a sustained output voltage responsive to said initial DC voltage variation and insensitive to DC voltage variations of less amplitude in the opposite direction; means connected thereto and controllable thereby, the said last named amplifier means disposed to produce a quiescent voltage in the absence of a variable DC signal and a first driving voltage or first output signal when a variable DC signal is present, said driving voltage persisting for a period of time after the termination of said variable DC signal.

11. A vehicle presence system according to claim 10 and wherein said gate circuit means includes interconnected sensing element means, each conductive during the presence of said in- and out-amplifier outputs and remaining conductive during the sustained in-amplifier output so as to render an output insensitive to vehicle movement within the loop confines.